United States Patent [19]

Cavalli

[11] Patent Number: 4,863,312
[45] Date of Patent: Sep. 5, 1989

[54] UNDERGROUND LEACHATE AND POLLUTANT DRAINAGE BARRIER SYSTEM

[75] Inventor: Nicholas J. Cavalli, Yonkers, N.Y.

[73] Assignee: Finic, B. V., Rotterdam, Netherlands

[21] Appl. No.: 517,500

[22] Filed: Jul. 26, 1983

[51] Int. Cl.$^4$ .................... E02B 11/00; F16L 1/02
[52] U.S. Cl. ........................ 405/128; 405/38; 405/50; 405/157; 405/179; 405/267; 299/11
[58] Field of Search ............... 405/36, 38, 43–45, 405/50, 51, 128, 129, 176, 179, 267, 157, 55; 299/11

[56] References Cited

U.S. PATENT DOCUMENTS

| | | | |
|---|---|---|---|
| 3,310,952 | 3/1967 | Veder | 405/267 |
| 3,603,097 | 9/1971 | Zakiewicz | 405/50 |
| 3,603,099 | 9/1971 | Zakiewicz | 405/157 |
| 3,625,010 | 12/1971 | Hakundy | 405/38 |
| 4,335,978 | 6/1982 | Mutch | 405/129 |
| 4,352,601 | 10/1982 | Valiga | 405/270 |
| 4,358,221 | 11/1982 | Wickberg | 405/128 |
| 4,366,846 | 1/1983 | Curah | 405/36 X |
| 4,375,930 | 3/1983 | Valiga | 405/267 X |
| 4,379,591 | 4/1983 | Tassoney | 405/267 X |
| 4,430,021 | 2/1984 | Wagner et al. | 405/129 |

OTHER PUBLICATIONS

"Slurry Trench Construction", *The Military Engineer*, Nov.–Dec. 1976.

Primary Examiner—Randolph A. Reese
Assistant Examiner—John A. Ricci
Attorney, Agent, or Firm—Jim Zegeer

[57] ABSTRACT

A leachate and pollutant drainage barrier system is formed by excavating a narrow slit or slot in the earth in the presence of a reversable slurry mud which changes from a highly viscous character after a predetermined period of time (approximately 5–7 days) needed to maintain the trench open to permit the laying of a drainage pipe at the bottom of the trench and the filling of the trench with a pervious fill, such as gravel, etc. After the fill has been installed, lateral support for the earth walls is provided by the pervious fill material and the slurry reverts to a liquid having a substantially lower viscosity which may be drained via the drain pipe in the bottom of the trench. In a preferred embodiment the slurry is a biodegradable polymer. In addition, a plastic film or layer can be installed in the trench.

8 Claims, 3 Drawing Sheets

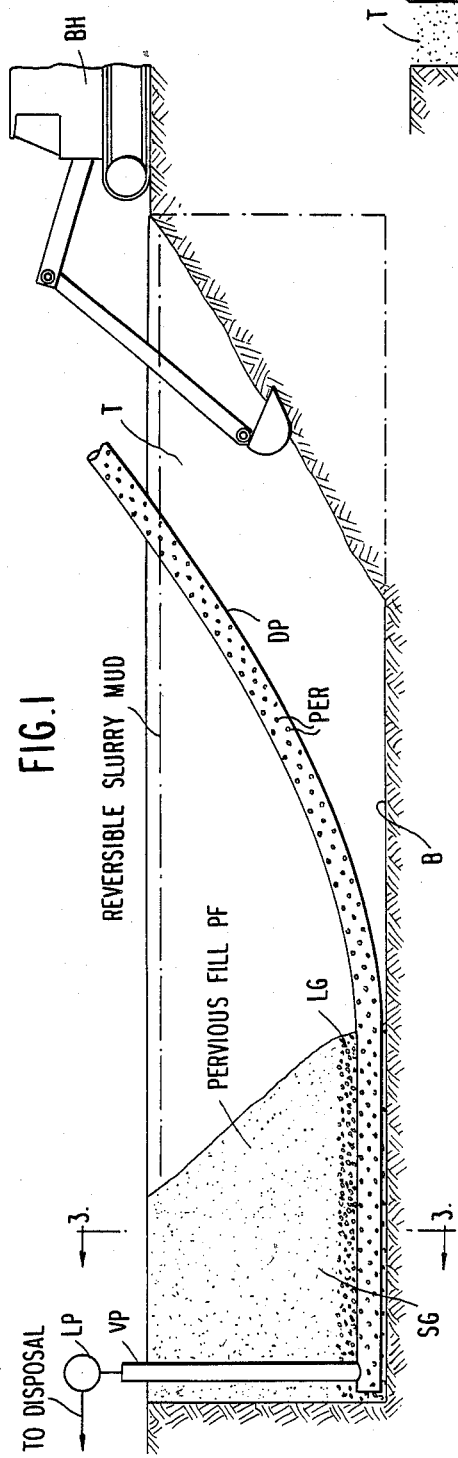
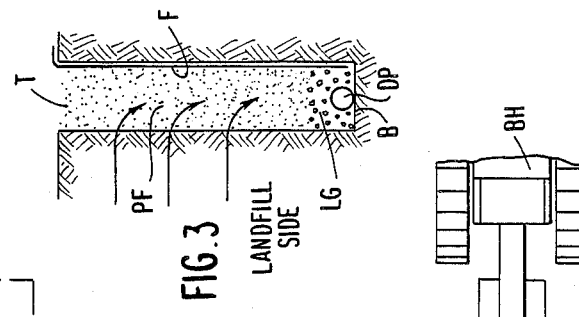
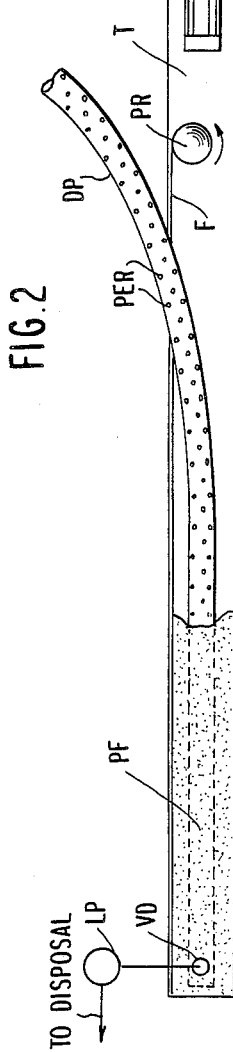

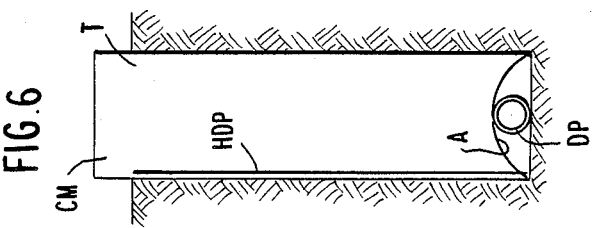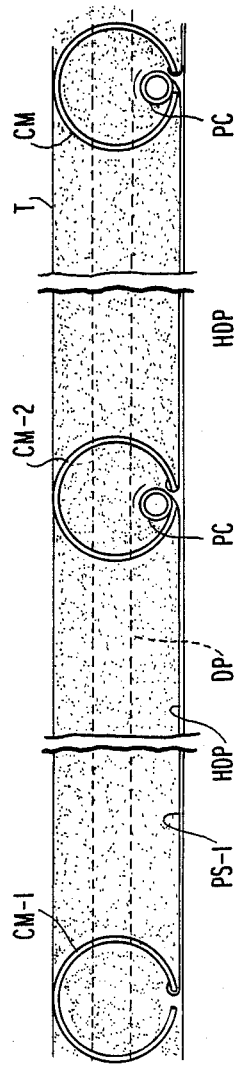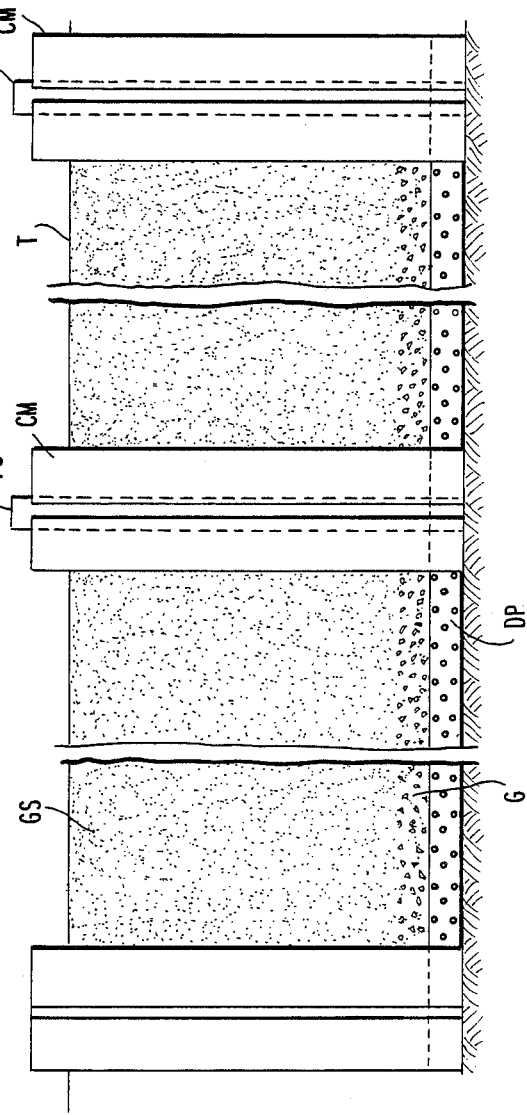

UNDERGROUND LEACHATE AND POLLUTANT DRAINAGE BARRIER SYSTEM

BACKGROUND OF THE INVENTION

Leachate and pollution control barriers and systems have been developed in recent times for purposes of containing, confining, and removing pollutants from waste storage, land fills, chemical storage areas, dumps, and nuclear waste storage facilities as disclosed in Ressi applicationn Ser. No. 252,676 and my patent application Ser. No. 468,724. In Veder U.S. Pat. No. 3,310,952, a bentonite slurry trench is made in the earth wherein the trench is backfilled with a gravel so as to erect a porous wall for the purpose of draining. There, the excavation was filled with gravel and sand of a size of grain adapted to the condition of the ground and to take care of simultaneous washing of the walls of the excavation so as to remove the sealing effect caused by the impermeable zone of bentonite. In that invention, the mixture of gravel and sand is brought into the trench in a permeable enclosure so as to prevent the penetration of the gravel into the surrounding soil. F. And G. Brunner's British Pat. No. 913,527 disclose the use of a slurry trench to lay pipe and the above referred to Ressi application discloses a cut-off barrier in which a porous fill with a pump system is sandwiched between a pair of plastic films which are joined along their bottom edges to form a sheath. For many years, there has been commercially available from American Colloid Corporation and others, a drilling mud useful in making water wells which drilling mud has a highly viscous character which, after a predetermined period of time, for example about 5 days, changes to almost the viscosity of water.

In the present invention, a drainage ditch is formed by excavating a narrow slot in the earth in the presence of a mud slurry having a highly viscous character which reverts or changes to a low viscosity after a period of time needed to maintain the trench open to permit the laying of a drainage pipe at the bottom of the trench and filling with a pervious fill such as gravel and sand mixed. After the gravel and sand mix has been installed, lateral support for the earth walls is provided by the pervious material and the slurry then reverts to a low viscosity liquid which may be drained via the drain pipe in the bottom of the drainage trench. In addition, a plastic film or layer may be installed in the trench opposite the the land fill or pollutant side a source to constitute an impervious membrane installed prior to filling with the porous fill material. Preferably, the film is installed on one side of the trench.

There are many advantages resulting from use of the invention such as it allows for the installation of a system to great depth, excavating a narrow slot which may be only two feet wide. The invention also allows for the installation of an impervious barrier as well as a leachate and pollution collection system. Since the excavation is narrow (two feet wide is typical), it minimizes the exposure to workers and the public when installation is to be made in a hazardous environment. In addition, since the trench is always maintained filled during excavation with the revertable slurry, noxious gases which may tend to escape when the trench is opened are contained and do not escape. The invention also reduces the amount of contaminated earth to be disposed of becaue of the narrowness of the slot or trench in the earth. Finally, the invention eliminates the handling of contaminated water to be pumped as in a conventional approach.

The above and other objects, advantages, and features of the invention will become more apparent when considered with the following specifications and accompanying drawings wherein:

FIG. 1 is a side elevational view showing the construction sequence,

FIG. 2 is a top plan view thereof,

FIG. 3 is a sectional view through lines 3—3 of FIG. 1.

FIG. 4 is a top plan of a further embodiment of the invention utilizing the panelization principles disclosed in my application Ser. No. 468,724 wherein the plastic membrane is installed in panel sections, FIG. 5 is a side elevational view of the embodiment shown in FIG. 4, and FIG. 6 is a partial sectional view showing the bottom of the trench with the panelization member showing the passage of the drain pipe therethrough.

DETAIL DESCRIPTION OF THE INVENTION

Refering now to FIGS. 1 and 2, a trench is excavated along the line of the leachate and pollutant barrier by a back hoe BH or other conventional slurry trench excavating equipment. For deeper depths, a clamshell excavator or Kelly bar type excavator may be utilized. During the excavation of the slot or trench T, the slot or trench is maintained full of a slurry mud which, in this invention is a reversible slurry mud which reveals to a low viscosity liquid after a predetermined period of time. An example of such a reversible slurry mud is a polymer drilling fluid which is obtained from the American Colloid Company under the trademark "VARI-FLO$_{TM}$", a Guar Gum organic polymer, as one of its drilling fluids. Such a drilling mud has been used in the past for drilling water wells and hence, is biodegradable and well known in the art. The breakdown time or period can be modified by the addition of a chemical, such as common swimming pool disinfectant and chlorinator known as HTH. Water has a viscosity of about 25 seconds Marsh funnel viscosity. The mixture polymer drilling fluid with water to about 40 second Marsh funnel viscosity which reverts in about 7 days to a much lower viscosity (approaching water), "REVERT$_{TM}$" is another material that can be used.

As the excavation of trench T proceeds and is maintained full of the reversible slurry mud, a plastic film or layer F is unrolled in the trench T from plastic film roll PR. In this embodiment, the plastic film roll is positioned contiguous to and in abutment against the non-landfill side of the trench so, as indicated in FIG. 3, leachate pollutants flowing from the pollutant source flows into the porous fill of the barrier or leachate system. After the plastic film has been installed a drainpipe DP, which preferably is a preforated pollution and leachate resistant high density polythelyne plastic pipe has uniform perforations PER along the length thereof is layed directly in on the bottom B of trench T. In FIG. 1, a vertical piep VP is coupled to the left end of drainpipe DP and coupled to a leachate pollutant pump LP and then delivered from the pump to the disposal system. There may be a plurality of leachate pollutant pumps distributed along the line of the barrier. The drainage pipe DP is then convered with a layer of gravel LG and then a pervious fill PF such as more gravel G or a mixture of sand and gravel SG. As shown in FIG. 3, leachate flow indicated by the arrows flows from the land fill or pollutant side of the barrier into the trench T and is directed downwardly to drainpipe DP through the porous filled PF and the layer of gravel LG to drainpipe DP by the impervious membrane constituted by the plastic film F. And any drainage or leachate or pollutant entering the drainpipe DP is removed by the leachate and pollutant pump LP.

After the filling of the trench with the pervious fill PF constituted by gravel layer LG and sand and gravel SG, the reversible slurry RS reverts to its low viscosity character (about the same is water) and can easily be removed through the drainage pipe DP.

For relatively deep trenches it may be desirable to utilize the invention disclosed in my application Ser. No. 468,724. In this case, the excavation of the trench T and the laying of the drain pipe DP in the presence of the reversible slurry mud proceeds as described above in connection with FIGS. 1 and 2. The plastic film in this case is installed in panel sections. High density polythylene sheets HDP are installed in panel form to form an impervious barrier to fluid flow particularly corrosive contaminants and pollutants. In an initial panel section PS-1, the high density polyethylene pipes or channel member CM-1 and CM-2. These channel members CM preferably (but not necessarily) have a width corresponding substantially to the trench T and typically the panels HDP will be of a length 15 to 30 feet. In the second and succeeding sections, the high density polyethylene sheet members pipe HDP have one end secured to a smaller diameter pipe PC with the film passing through a slot in the channel member CM-2 and the smaller diameter pipe PC telescoping within the channel member CM-2. The lower ends of the channel members CM can rest on the drainpipe DP or have a notch or arch A in the lower end thereof to permit passage of the drainpipe DP. The remaining portions of the channel members are filled with a nonshrink grout to form a tight impervious joint. Again, after the installation of the impervious film HDP in panel sections, the trench is filled with a porous fill material such as a layer of gravel G directly on the drainpipe and then completed by being filled with porous fill material GS which may be gravel or a mixture of sand and gravel or the like.

Pollution control barriers constructed in accordance with the present invention have numerous advantages in addition to being relatively inexpensive to construct. It can be rapidly executed with minimum change to the environment; no noxious fumes escape; sampling of the pumped leachate provides information useful in controlling and limiting further pollution and the slurry is biodegradable. While I've disclosed my preferred embodiments of the invention it will be appreciated by those skilled in the art that various modifications and adaptions can be made to the invention without departing from the spirit and scope thereof as set forth in the appended claims.

What I claim is:

1. A method of constructing an underground leachate and pollutant drainage barrier system comprising the steps of,
   (a) excavating an elongated trench in the presence of a highly viscous excavation slurry which changes to a low viscosity after a predetermined period of time,
   (b) installing a pumping system extending to the bottom of said trench while said slurry is in the trench and before said slurry changes to its low viscosity character, and
   (c) filling said elongated trench with a pervious fill material before said slurry changes to its low viscosity character.

2. The method defined in claim 1 further comprising
   (d) installing a drainage pipe coupled to said pumping system in the bottom of said trench prior to change of said slurry to a low viscosity and the filling of said trench with said pervious fill, and
   (e) draining said slurry from said trench through said drainage pipe and pumping system.

3. The invention defined in claim 2 including the step f) of installing a plastic film contiguous to and in abutment with one side of said trench before the filling thereof with said previous material.

4. The invention defined in claim 3 wherein said plastic film is installed in a plurality of panel sections.

5. The invention defined in claim 1 including the step f) of installing a plastic film adjacent one side of said trench before the filling thereof with said pervious material.

6. The invention defined in claim 5 wherein siad plastic film is installed in a plurality of panel sections.

7. The invention defined in claim 1 wherein said slurry is an organic polymer.

8. The invention defined in claim 1 wherein said slurry is biodegradable.

* * * * *